US012294838B2

(12) United States Patent
Ding

(10) Patent No.: US 12,294,838 B2
(45) Date of Patent: May 6, 2025

(54) SURFACE TREATMENT TECHNOLOGY OF MAGNETIC CIRCUIT OF LOUDSPEAKER

(71) Applicant: Shengzhou Greatt Electronics Co., Ltd., Shaoxing (CN)

(72) Inventor: Shanjun Ding, Shaoxing (CN)

(73) Assignee: Shengzhou Greatt Electronics Co., Ltd., Shaoxing (CN)

( * ) Notice: Subject to any disclaimer, the term of this patent is extended or adjusted under 35 U.S.C. 154(b) by 295 days.

(21) Appl. No.: 18/125,014

(22) Filed: Mar. 22, 2023

(65) Prior Publication Data

US 2024/0205624 A1 Jun. 20, 2024

(30) Foreign Application Priority Data

Dec. 20, 2022 (CN) ........................ 202211644160.0

(51) Int. Cl.

| | |
|---|---|
| ***H04R 29/00*** | (2006.01) |
| ***H04R 9/02*** | (2006.01) |
| ***H04R 9/06*** | (2006.01) |
| ***H04R 31/00*** | (2006.01) |

(52) U.S. Cl.

CPC .......... *H04R 29/003* (2013.01); *H04R 9/025* (2013.01); *H04R 9/06* (2013.01); *H04R 31/00* (2013.01)

(58) Field of Classification Search

CPC ........ H04R 29/003; H04R 9/025; H04R 9/06; H04R 2209/024

USPC ................................ 381/189, 150, 412, 396

See application file for complete search history.

(56) References Cited

U.S. PATENT DOCUMENTS

2004/0156524 A1* 8/2004 Okuzawa ............. C23C 18/127 381/396

* cited by examiner

*Primary Examiner* — Thjuan K Addy

(74) *Attorney, Agent, or Firm* — Hemisphere Law, PLLC; Zhigang Ma

(57) ABSTRACT

A surface treatment method of magnetic circuit of loudspeaker includes: S1, assembling components of the magnetic circuit; S2, painting treatment; S3, assembling the loudspeaker; and S4, testing and packaging. In the S1, a T yoke and a magnet are cleaned with a detergent to ensure that adhered surfaces do not remain any pollutants, and surfaces of the T yoke and the magnet are mechanically treated by one of grinding, sanding and sandblasting to obtain a better adhered effect. By painting the surface of the magnetic circuit, the method repairs surface defects of the magnetic circuit, improves the product quality, provides a personalized design, increases the diversity of the product appearance, and makes the product more marketable. The method is simple and mature, and the cost is low. The method integrates components of the loudspeaker by painting, making the product appearance more beautiful and protective without affecting the product performance.

7 Claims, 1 Drawing Sheet

SURFACE TREATMENT TECHNOLOGY OF MAGNETIC CIRCUIT OF LOUDSPEAKER

TECHNICAL FIELD

The disclosure relates to the technical field of loudspeaker manufacturing, in particular to a surface treatment technology of magnetic circuit of loudspeaker.

BACKGROUND

The loudspeaker is a modern electroacoustic component whose function is to convert electrical signals into sounds, also known as a speaker. Now the loudspeaker sold in the market pays attention to the display of the front appearance design and color painting printing, and the magnetic circuit of loudspeaker is basically ignored. Some loudspeakers are designed with a magnetic steel sleeve to protect the magnetic circuit, but the cost will increase a lot, and it is not easy to dissipate heat, resulting in the loss of performance; at the same time, the cost on the mold is also expensive, and the universality of the magnetic steel sleeve is poor. The magnetic circuit of loudspeaker in the prior art is mainly black, with rough and monotonous appearance and obvious defects, which cannot meet the personalized requirements.

SUMMARY

A purpose of the disclosure is to provide a surface treatment method of magnetic circuit of loudspeaker to solve the problems in the above background technology. To achieve the above purpose, the disclosure provides following technical solutions: a surface treatment method of magnetic circuit of loudspeaker, including: step one: assembling components of the magnetic circuit; step two: painting treatment; step three: assembling the loudspeaker; and step four: testing and packaging.

Specifically, in the step one, a T yoke (also referred to as T iron or pole piece) and a magnet of the components of the loudspeaker are adhered and assembled by an adhesive, and a composition of the T yoke and the magnet is obtained after the adhesive is solidified; the step two is performed next.

Specifically, in the step two, a coating material is selected according to needs of a customer, after viscosity adjustment and color adjustment are performed on the coating material, a spray gun is used to spray paint the coating material on the composition of the T yoke and the magnet, and then the coating material on the composition of the T yoke and the magnet is baked and solidified to form a paint film which has decorative and protective effects on a surface of the composition of the T yoke and the magnet, thereby to obtain a finished magnetic circuit assembly.

Specifically, in the step three, the finished magnetic circuit assembly obtained in the step two is transferred to an assembly workshop, and the finished magnetic circuit assembly is assembled with other components of the loudspeaker to obtain a finished loudspeaker.

Specifically, in the step four, performance tests are performed on the finished loudspeaker obtained in the step three, and a qualified loudspeaker is packaged and stored.

In an embodiment, in the step one, the adhesive is an acrylic AB adhesive.

In an embodiment, in the step one, before the T yoke and the magnet are adhered, the T yoke and the magnet need to be cleaned with a detergent to ensure that adhered surfaces of the T yoke and the magnet do not remain any pollutants, surfaces of the T yoke and the magnet are mechanically treated by one of grinding, sanding, and sandblasting to improve roughnesses of the adhered surfaces to obtain a better adhered effect.

In an embodiment, a caliber of the spray gun is in a range of 0.5-1.8 millimeters (mm), a spray pressure of the spray gun is in a range of 0.3-0.6 megapascals (MPa), and a distance between a nozzle of the spray gun and a surface to be sprayed is in a range of 20-30 centimeters (cm).

In an embodiment, in the step two, a baking temperature is in a range of 60-100 Celsius degrees (° C.) and a baking time is in a range of 25-35 minutes (min).

In an embodiment, in the step two, quality tests are needed to be performed on the paint film of the finished magnetic circuit assembly, and the quality tests include an adhesion test, a gloss test, a color test, and a surface condition test.

In an embodiment, the adhesion test includes: using a blade to cut four scratches vertically and horizontally on the paint film to form nine squares while each of the nine squares has an area of 1 $mm^2$, and then using a brush to brush back and forth along diagonal lines of the nine squares to observe a peeling situation of the paint film; or using a pressure-sensitive adhesive tape to stick on a surface of the paint film, and then pulling off the adhesive tape to check adhesion of the paint film.

Compared with the prior art, the disclosure has the following beneficial effects: by painting the surface of the magnetic circuit of loudspeaker, the disclosure repairs surface defects of the magnetic circuit, improves the product quality, provides a personalized design, increases the diversity of the product appearance, and makes the product more marketable. The technology adopted by disclosure is simple and mature, and the cost is low. The disclosure integrates the components of loudspeaker by painting, making the appearance of the product more beautiful and protective, and will not affect the performance of the product.

DETAILED DESCRIPTION OF EMBODIMENTS

The following will give a clear and complete description of technical solutions in the embodiments of the disclosure in combination with attached drawings in the embodiments of the disclosure. Apparently, the described embodiments are only a part of the embodiments of the disclosure, not all of them. Based on the embodiments of the disclosure, all other embodiments obtained by those ordinary skilled in the art without creative work should fall within the scope of protection of the disclosure.

Figure 1:
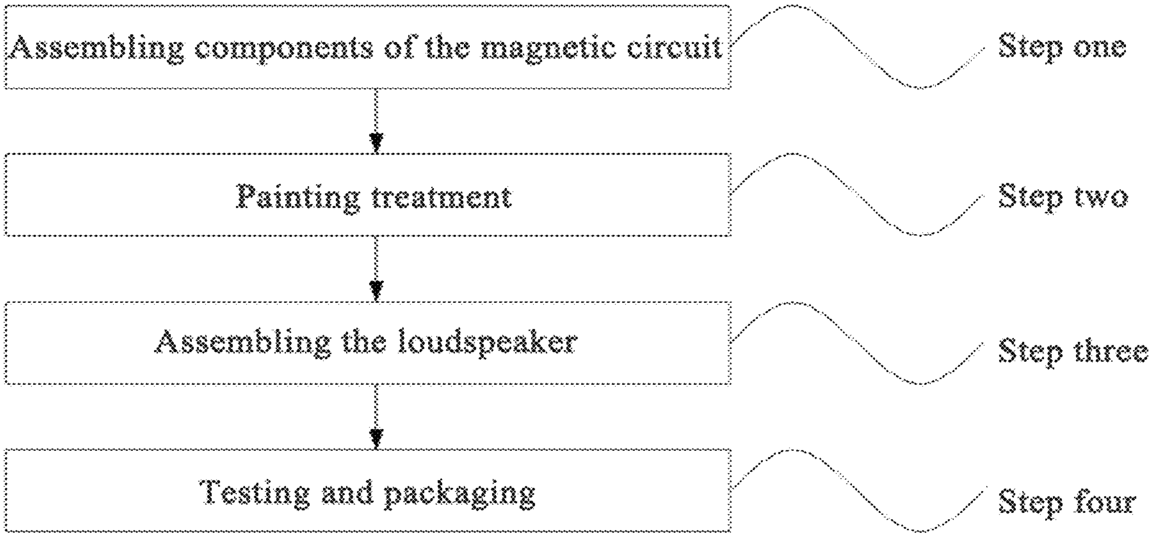
FIG. 1 is a flowchart of a process of the disclosure.
Figure 2:
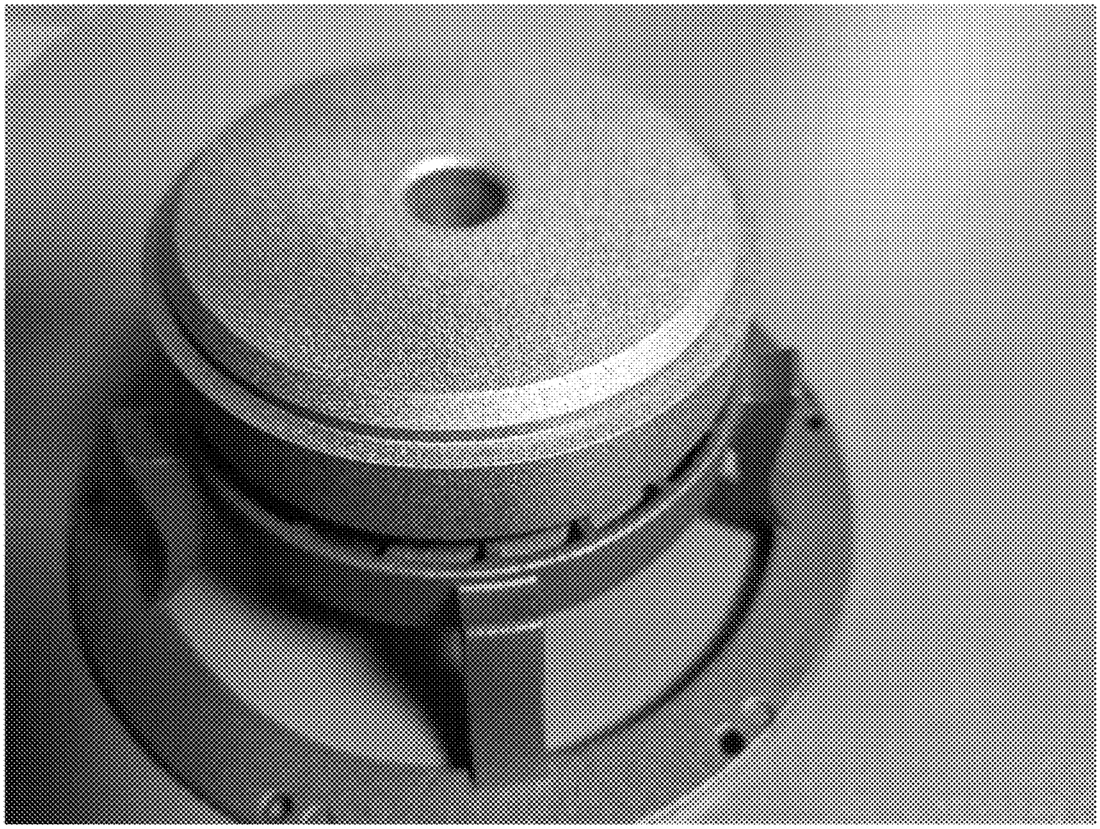
FIG. 2 is a physical view of a finished magnetic circuit assembly of the disclosure.

Please refer to FIG. 1 and FIG. 2, an embodiment of the disclosure includes: a surface treatment method of magnetic circuit of loudspeaker, including: step one: assembling components of the magnetic circuit components; step two: painting treatment; step three: assembling the loudspeaker; and step four: testing and packaging.

In the embodiment, in the step one, before the T yoke and the magnet are adhered, the T yoke and the magnet of the components need to be cleaned with a detergent to ensure that adhered surfaces of the T yoke and the magnet do not remain any pollutants, and surfaces of the T yoke and the magnet are mechanically treated by one of grinding, sanding, and sandblasting to improve roughnesses of the adhered surfaces to obtain a better adhered effect. Then the T yoke and the magnet of the loudspeaker are adhered and assembled by an acrylic AB adhesive, and a composition of the T yoke and the magnet is obtained after the adhesive is solidified; and the step two is performed next.

In the embodiment, in the step two, a coating material is selected according to needs of a customer, after viscosity adjustment and color adjustment are performed on the coating material, a spray gun is used to spray paint the coating material on the composition of the T yoke and the magnet, and then the coating material on the composition of the T yoke and the magnet is baked and solidified to form a paint film which has decorative and protective effects on a surface of the composition of the T yoke and the magnet, thereby to obtain a finished magnetic circuit assembly. Specifically, a caliber of the spray gun is in a range of 0.5-1.8 millimeters (mm), a spray pressure of the spray gun is in a range of 0.3-0.6 megapascals (MPa), and a distance between a nozzle of the spray gun and a surface to be sprayed is in a range of 20-30 centimeters (cm); and a baking temperature is in a range of 60-100 Celsius degrees (° C.) and a baking time is in a range of 25-35 minutes (min). Quality tests are needed to be performed on the paint film of the finished magnetic circuit assembly, and the quality tests include an adhesion test, a gloss test, a color test, and a surface condition test. The adhesion test includes: using a blade to cut four scratches vertically and horizontally on the paint film to form nine squares while each of the nine squares has an area of 1 $mm^2$, and then using a brush to brush back and forth along diagonal lines of the nine squares to observe a peeling situation of the paint film; or using a pressure-sensitive adhesive tape to stick on a surface of the paint film, and then pulling off the adhesive tape to check adhesion of the paint film.

In the embodiment, in the step three, the finished magnetic circuit assembly obtained in the step two is transferred to an assembly workshop, and the finished magnetic circuit assembly is assembled with other components of the loudspeaker to obtain a finished loudspeaker.

In the embodiment, in the step four, performance tests are performed on the finished loudspeaker obtained in the step three, and a qualified loudspeaker is packaged and stored.

Based on the above description, the disclosure has following advantages: the disclosure processes the surface of the magnetic circuit of speaker through a simple and mature spray paint process which integrates the components of the magnetic circuit by the spray paint, achieving the repair of the defects of the components, and the paint film can protect the surfaces of the components, greatly improving the product quality. The disclosure can customize color patterns according to customers' preferences, make the appearance of the speaker more beautiful, and greatly enhance the value of the product.

For those skilled in the art, it is apparent that the disclosure is not limited to the details of the above embodiments, and can be realized in other specific forms without departing from the spirit or basic features of the disclosure. Therefore, the above embodiments should be considered exemplary and non-limiting. The scope of protection of the disclosure is defined by the appended claims rather than the above description, and it is intended to include all variations falling within the meaning and scope of the equivalent elements of the claims in the disclosure. Any reference mark in the claims shall not be regarded as a limit to the claims involved.

What is claimed is:

1. A surface treatment method of magnetic circuit of loudspeaker, comprising:

step one: assembling components of the magnetic circuit;

step two: painting treatment;

step three: assembling the loudspeaker; and step four: testing and packaging;

wherein in the step one, a T yoke and a magnet of the components of the loudspeaker are adhered and assembled by an adhesive, and a composition of the T yoke and the magnet is obtained after the adhesive is solidified; and the step two is performed next;

wherein in the step two, a coating material is selected according to needs of a customer, after viscosity adjustment and color adjustment are performed on the coating material, a spray gun is used to spray paint the coating material on the composition of the T yoke and the magnet, and then the coating material on the composition of the T yoke and the magnet is baked and solidified to form a paint film on a surface of the composition of the T yoke and the magnet, thereby to obtain a magnetic circuit assembly;

wherein in the step three, the magnetic circuit assembly obtained in the step two is transferred to an assembly workshop, and the magnetic circuit assembly is assembled with other components of the loudspeaker to obtain a finished loudspeaker; and wherein in the step four, performance tests are performed on the finished loudspeaker obtained in the step three, and a qualified loudspeaker is packaged and stored.

2. The surface treatment method of magnetic circuit of loudspeaker according to claim 1, wherein in the step one, the adhesive is an acrylic AB adhesive.

3. The surface treatment method of magnetic circuit of loudspeaker according to claim 1, wherein in the step one, the T yoke and the magnet are cleaned with a detergent to ensure that adhered surfaces of the T yoke and the magnet do not remain any pollutants, surfaces of the T yoke and the magnet are mechanically treated by one of grinding, sanding, and sandblasting.

4. The surface treatment method of magnetic circuit of loudspeaker according to claim 1, wherein in the step two, a caliber of the spray gun is in a range of 0.5-1.8 millimeters (mm), a spray pressure of the spray gun is in a range of 0.3-0.6 megapascals (MPa), and a distance between a nozzle of the spray gun and a surface to be sprayed is in a range of 20-30 centimeters (cm).

5. The surface treatment method of magnetic circuit of loudspeaker according to claim 1, wherein in the step two, a baking temperature is in a range of 60-100 Celsius degrees (° C.) and a baking time is in a range of 25-35 minutes (min).

6. The surface treatment method of magnetic circuit of loudspeaker according to claim 1, wherein in the step two, quality tests are performed on the paint film of the magnetic circuit assembly, and the quality tests comprise an adhesion test, a gloss test, a color test, and a surface condition test.

7. The surface treatment method of magnetic circuit of loudspeaker according to claim 6, wherein the adhesion test comprises:

using a blade to cut four scratches vertically and horizontally on the paint film to form nine squares while each of the nine squares has an area of 1 $mm^2$, and then using a brush to brush back and forth along diagonal lines of the nine squares to observe a peeling situation of the paint film; or using a pressure-sensitive adhesive tape to stick on a surface of the paint film, and then pulling off the adhesive tape to check adhesion of the paint film.

* * * * *